(12) United States Patent  (10) Patent No.:  US 12,658,441 B2

Matsuhara  (45) Date of Patent:  *Jun. 16, 2026

(54) NEGATIVE ELECTRODE ACTIVE MATERIAL AND LITHIUM ION SECONDARY BATTERY INCLUDING NEGATIVE ELECTRODE ACTIVE MATERIAL

(71) Applicant: Prime Planet Energy & Solutions, Inc., Tokyo (JP)

(72) Inventor: Shinsuke Matsuhara, Miyoshi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 586 days.

This patent is subject to a terminal disclaimer.

(21) Appl. No.: 17/541,265

(22) Filed: Dec. 3, 2021

(65) Prior Publication Data

US 2022/0181626 A1  Jun. 9, 2022

(30) Foreign Application Priority Data

Dec. 4, 2020  (JP) ................................. 2020-201681

(51) Int. Cl.
H01M 4/583 (2010.01)
H01M 4/02 (2006.01)
(Continued)

(52) U.S. Cl.
CPC ......... H01M 4/583 (2013.01); H01M 4/0428 (2013.01); H01M 4/133 (2013.01);
(Continued)

(58) Field of Classification Search
CPC .... H01M 4/0428; H01M 4/133; H01M 4/366; H01M 4/583; H01M 10/0525; H01M 2004/027; H01M 2220/20
See application file for complete search history.

(56) References Cited

U.S. PATENT DOCUMENTS

2010/0009261 A1  1/2010  Watanabe
2013/0244118 A1*  9/2013  Onizuka ............... H01M 4/133
29/623.5

(Continued)

FOREIGN PATENT DOCUMENTS

CN  103229338 A  7/2013
CN  103864057 A  *  6/2014
(Continued)

OTHER PUBLICATIONS

He et al., Hierarchical C—P(=O)(--O--)n (n≤2)-linked nano-Si/N-doped C/ graphene porous foam as anodes for high-performance lithium ion batteries, Oct. 4, 2018, Carbon 141, 531-541 (Year: 2018).*

(Continued)

*Primary Examiner* — Armindo Carvalho, Jr.
(74) *Attorney, Agent, or Firm* — HAUPTMAN HAM, LLP

(57) ABSTRACT

The present disclosure provides a negative electrode active material that can realize excellent low temperature characteristics. The negative electrode active material for a lithium ion secondary battery disclosed herein includes a carbon material that is able to reversibly occlude and release lithium ions and a carbon coating layer that is formed on a surface of the carbon material, and the carbon coating layer contains carbon atoms and phosphorus atoms. In addition, in the carbon coating layer, when a peak of a P2p spectrum measured by X-ray photoelectron spectroscopy (XPS) is subjected to waveform separation, there is a peak at a position at which a binding energy is 131 eV, and an intensity ratio $(I_D/I_G)$ of a peak intensity $I_G$ at 1,580 cm$^{-1}$ to a peak intensity $I_D$ at 1,360 cm$^{-1}$ in a Raman spectrum is 0.4 or more and 0.7 or less.

3 Claims, 3 Drawing Sheets

<u>80</u>

84

82

(51) Int. Cl.
| | |
|---|---|
| *H01M 4/04* | (2006.01) |
| *H01M 4/133* | (2010.01) |
| *H01M 4/36* | (2006.01) |
| *H01M 10/0525* | (2010.01) |

(52) U.S. Cl.
CPC ....... *H01M 4/366* (2013.01); *H01M 10/0525* (2013.01); *H01M 2004/027* (2013.01); *H01M 2220/20* (2013.01)

(56) References Cited

U.S. PATENT DOCUMENTS

| | | | |
|---|---|---|---|
| 2016/0315353 A1 | 10/2016 | Matsushita et al. | |
| 2017/0092939 A1* | 3/2017 | Kim .................. | H01M 10/0569 |
| 2020/0020927 A1 | 1/2020 | Sadakane | |

FOREIGN PATENT DOCUMENTS

| | | | | | |
|---|---|---|---|---|---|
| CN | 106099100 A | 11/2016 | | | |
| CN | 110392949 A | 10/2019 | | | |
| CN | 111082028 A | * | 4/2020 | | |
| JP | 2009-117334 A | | 5/2009 | | |
| JP | 2010-092817 A | | 4/2010 | | |
| JP | 201129160 A | | 2/2011 | | |
| JP | 2011-146365 A | | 7/2011 | | |
| JP | 201410998 A | | 1/2014 | | |
| JP | 2014139942 A | | 7/2014 | | |
| JP | 2018181764 A | | 11/2018 | | |
| KR | 20200046688 A | * | 5/2020 | ............ | H01M 4/587 |
| WO | 2012070153 A1 | | 5/2012 | | |
| WO | 2018173521 A1 | | 9/2018 | | |

OTHER PUBLICATIONS

Rey-Raap et al., Phosphorus-doped carbon/carbon nanotube hybrids as high-performance electrodes for supercapacitors, Jul. 10, 2020, Electrochimica Acta, 354, 1-13 (Year: 2020).*
CN-103864057-A English machine translation (Year: 2024).*
CN-111082028-A English machine translation (Year: 2025).*
KR-20200046688-A English machine translation (Year: 2025).*

\* cited by examiner

80

84

82

NEGATIVE ELECTRODE ACTIVE MATERIAL AND LITHIUM ION SECONDARY BATTERY INCLUDING NEGATIVE ELECTRODE ACTIVE MATERIAL

CROSS-REFERENCE TO RELATED APPLICATIONS

This application claims priority based on Japanese Patent Application No. 2020-201681 filed on Dec. 4, 2020, and the entire contents of the application are incorporated herein by reference.

BACKGROUND

1. Technical Field

The present disclosure relates to a negative electrode active material and a lithium ion secondary battery including the negative electrode active material.

2. Description of the Background

In recent years, secondary batteries such as lithium ion secondary batteries have been suitably used for portable power supplies for personal computers and mobile terminals and power supplies for driving vehicles such as battery electric vehicles (BEV), hybrid electric vehicles (HEV), and plug-in hybrid electric vehicles (PHEV).

In the related art, a carbon material such as graphite is often used as a negative electrode active material for a lithium ion secondary battery. Further, in order to improve battery performance, a negative electrode active material having a coating layer containing various compounds on a surface of a carbon material is known, and for example, a negative electrode active material having a coating layer containing a phosphorous-containing compound (for example, a phosphate compound, etc.) is disclosed (WO 2012/070153, Japanese Patent Application Publication No. 2014-10998, WO 2018/173521, Japanese Patent Application Publication No. 2011-29160, and Japanese Patent Application Publication No. 2018-181764).

SUMMARY

Incidentally, generally, in a low temperature environment (for example, in a −10° C. environment), the capacity of a lithium ion secondary battery tends to decrease. Therefore, a lithium ion secondary battery that can maintain a favorable capacity and has excellent low temperature characteristics even in a low temperature environment is desired.

Therefore, the present disclosure has been made in view of the above circumstances, and a main object of the present disclosure is to provide a negative electrode active material that can realize excellent low temperature characteristics. In addition, another object is to provide a lithium ion secondary battery including such a negative electrode active material. In addition, another object is to provide a preferable method of producing the negative electrode active material disclosed herein.

In order to address the above problems, the inventors conducted extensive studies and as a result, found that, in a negative electrode active material including a carbon material having on a surface thereof a coating layer having a structure in which phosphorus atoms and carbon atoms are bonded to each other, excellent low temperature character-istics can be realized by adjusting the crystallinity of the coating layer to be within a predetermined range.

That is, the negative electrode active material disclosed herein includes a carbon material that is able to reversibly occlude and release lithium ions and a carbon coating layer that is formed on a surface of the carbon material, and the carbon coating layer contains carbon atoms and phosphorus atoms. In addition, in the carbon coating layer, when a peak of a P2p spectrum measured by X-ray photoelectron spectroscopy (XPS) is subjected to waveform separation, it has a peak at a position at which a binding energy is 131 eV, and an intensity ratio ($I_D/I_G$) of a peak intensity $I_G$ at 1,580 cm$^{-1}$ to a peak intensity $I_D$ at 1,360 cm$^{-1}$ in a Raman spectrum is 0.4 or more and 0.7 or less.

With such a configuration, it is possible to provide a negative electrode active material that imparts excellent low temperature characteristics to a lithium ion secondary battery.

In addition, in a preferable aspect of the negative electrode active material disclosed herein, in the carbon coating layer, when a sum of a peak area of a C1s spectrum, a peak area of an O1s spectrum, and a peak area of the P2p spectrum measured by XPS is 100%, a proportion of the peak area at the position of 131 eV is 0.4% or more and 0.7% or less.

With such a configuration, it is possible to more suitably impart excellent low temperature characteristics to a lithium ion secondary battery.

In addition, in order to achieve the above object, a lithium ion secondary battery including a negative electrode active material disclosed herein is provided. That is, the lithium ion secondary battery disclosed herein includes a positive electrode, a negative electrode, and a non-aqueous electrolyte, the negative electrode has a negative electrode active material layer, and the negative electrode active material layer includes the negative electrode active material disclosed herein.

With such a configuration, it is possible to provide a lithium ion secondary battery having excellent low temperature characteristics.

In addition, in order to achieve the above object, a preferable method of producing the negative electrode active material disclosed herein is provided. That is, the method of producing the negative electrode active material disclosed herein includes: preparing a carbon material that is able to reversibly occlude and release lithium ions; forming a carbon coating layer containing carbon atoms and phosphorus atoms on a surface of the carbon material by a CVD method; and firing the carbon material having the carbon coating layer, and performing adjustment so that an intensity ratio ($I_D/I_G$) of a peak intensity $I_G$ at 1,580 cm$^{-1}$ to a peak intensity $I_D$ at 1,360 cm$^{-1}$ in a Raman spectrum of the carbon coating layer is 0.4 or more and 0.7 or less.

DETAILED DESCRIPTION

Figure 1:
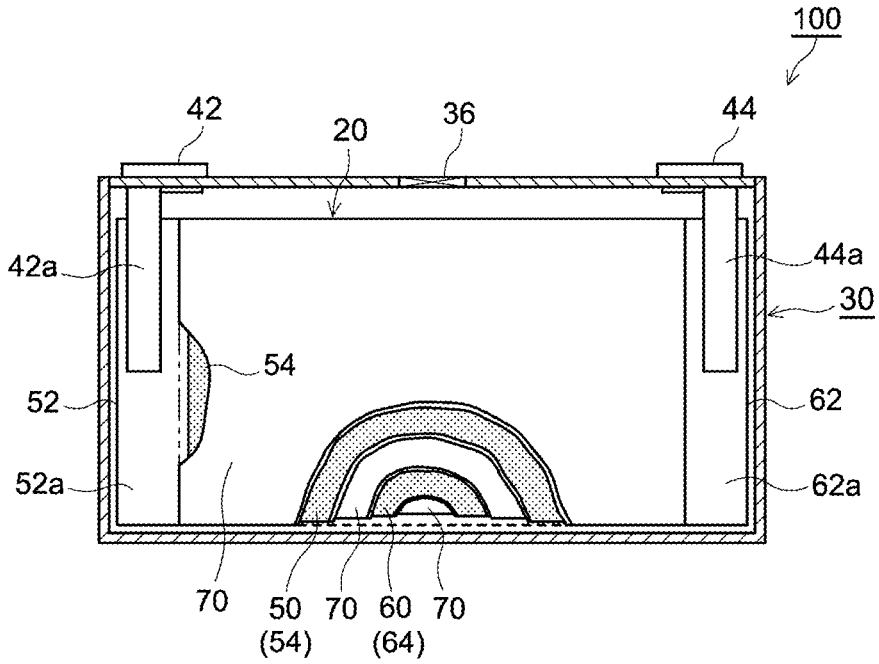
FIG. 1 is a cross-sectional view schematically showing a configuration of a lithium ion secondary battery according to one embodiment.

Hereinafter, one embodiment of technologies disclosed herein will be described in detail with reference to the drawings. Here, components other than those specifically mentioned in this specification that are necessary for implementing the present technologies can be recognized by those skilled in the art as design matters based on the related art in the field. The technology disclosed herein can be implemented based on content disclosed in this specification and common general technical knowledge in the field. In addition, members and portions having the same functions are denoted by the same reference number as in the following drawings, and redundant descriptions thereof will be omitted or simplified. In addition, the sizes (a length, a width, a thickness, etc.) in the drawings do not reflect actual sizes.

The term "lithium ion secondary battery" in this specification refers to a secondary battery in which lithium ions are used as charge carriers, and charging and discharging are performed by movement of charges according to lithium ions between a positive electrode and a negative electrode.

In addition, the terms "positive electrode active material" and "negative electrode active material" in this specification refer to a substance that is able to reversibly occlude and release (typically, insert and desorb) chemical species (that is, lithium ions) as charge carriers in a lithium ion secondary battery.

A lithium ion secondary battery 100 shown in FIG. 1 is a rectangular sealed battery constructed by accommodating a flat electrode body 20 and a non-aqueous electrolytic solution (not shown) inside a battery case 30. The battery case 30 includes a positive electrode terminal 42 and a negative electrode terminal 44 for external connection. In addition, a thin-walled safety valve 36 that is set to release an internal pressure when the internal pressure of the battery case 30 increases to a predetermined level or more is provided. In addition, in the battery case 30, a liquid injection port (not shown) through which a non-aqueous electrolytic solution is injected is provided. The material of the battery case 30 is preferably a metal material having high strength, being lightweight, and having favorable thermal conductivity, and examples of such a metal material include aluminum and steel.

Figure 2:
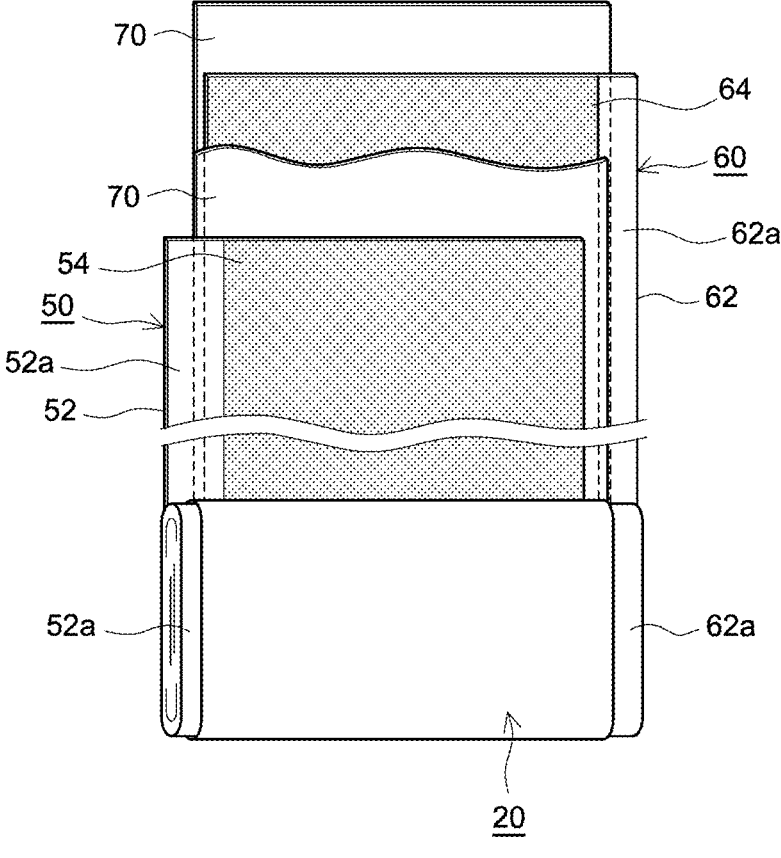
FIG. 2 is a schematic exploded view showing a configuration of a wound electrode body of a lithium ion secondary battery according to one embodiment.

As shown in FIG. 1 and FIG. 2, the electrode body 20 is a wound electrode body in which a long sheet-shaped positive electrode 50 and a long sheet-shaped the negative electrode 60 are laminated with two long sheet-shaped separators 70 therebetween, and wound around a winding axis. The positive electrode 50 includes a positive electrode current collector 52 and a positive electrode active material layer 54 formed on one side or both sides of the positive electrode current collector 52 in the longitudinal direction. On an edge on one side of the positive electrode current collector 52 in the winding axis direction (that is, the sheet width direction orthogonal to the longitudinal direction), a part in which the positive electrode active material layer 54 is not formed in a band shape along the edge and the positive electrode current collector 52 is exposed (that is, a positive electrode current collector exposed part 52a) is provided. In addition, the negative electrode 60 includes a negative electrode current collector 62 and a negative electrode active material layer 64 formed on one side or both sides of the negative electrode current collector 62 in the longitudinal direction. On an edge on the side opposite to one side of the negative electrode current collector 62 in the winding axis direction, a part in which the negative electrode active material layer 64 is not formed in a band shape along the edge and the negative electrode current collector 62 is exposed (that is, a negative electrode current collector exposed part 62a) is provided. A positive electrode current collector plate 42a and a negative electrode current collector plate 44a are bonded to the positive electrode current collector exposed part 52a and the negative electrode current collector exposed part 62a, respectively. The positive electrode current collector plate 42a is electrically connected to the positive electrode terminal 42 for external connection, and realizes conduction between the inside and the outside of the battery case 30. Similarly, the negative electrode current collector plate 44a is electrically connected to the negative electrode terminal 44 for external connection, and realizes conduction between the inside and the outside of the battery case 30.

Regarding the positive electrode current collector 52 constituting the positive electrode 50, for example, an aluminum foil may be exemplified. Regarding the positive electrode active material of the positive electrode active material layer 54, for example, lithium composite metal oxides having a layered structure, a spinel structure, or the like (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, $LiFePO_4$, etc.) may be exemplified. In addition, the positive electrode active material layer 54 may contain a conductive material, a binder, and the like. Regarding the conductive material, for example, carbon black such as acetylene black (AB) or other carbon materials (graphite, etc.) can be suitably used. Regarding the binder, for example, polyvinylidene fluoride (PVDF) or the like can be used.

The positive electrode active material layer 54 can be formed by dispersing a positive electrode active material and a material (a conductive material, a binder, etc.) used as necessary in a suitable solvent (for example, N-methyl-2-pyrrolidone: NMP) to prepare a paste (or slurry) composition, applying an appropriate amount of the composition to a surface of the positive electrode current collector 52, and drying it.

Regarding the negative electrode current collector 62 constituting the negative electrode 60, for example, a copper foil may be exemplified. The negative electrode active material layer 64 contains a negative electrode active material disclosed herein. In addition, the negative electrode active material layer 64 may further contain a binder, a thickener and the like. Regarding the binder, for example, styrene butadiene rubber (SBR) or the like can be used. Regarding the thickener, for example, carboxymethyl cellulose (CMC) or the like can be used.

The negative electrode active material layer 64 can be formed by dispersing a negative electrode active material and a material (a binder, etc.) used as necessary in a suitable solvent (for example, deionized water) to prepare a paste (or slurry) composition, applying an appropriate amount of the composition to a surface of the negative electrode current collector 62, and drying it.

Regarding the separator 70, various microporous sheets similar to those used in lithium ion secondary batteries in the related art can be used, and for example, a microporous resin sheet made of a resin such as polyethylene (PE) and polypropylene (PP) may be exemplified. Such a microporous resin sheet may have a single-layer structure or a multi-layer structure including two or more layers (for example, a three-layer structure in which a PP layer is laminated on both surfaces of a PE layer). In addition, on the surface of the separator 70, a heat resistant layer (HRL) may be provided, and for example, a ceramic (alumina, boehmite, etc.) may be applied.

Regarding the non-aqueous electrolyte, those used in the lithium ion secondary batteries in the related art can be used, and typically an organic solvent (non-aqueous solvent) containing a supporting salt can be used. Regarding the non-aqueous solvent, aprotic solvents such as carbonates, esters, and ethers can be used. Among these, carbonates, for example, ethylene carbonate (EC), diethyl carbonate (DEC), dimethyl carbonate (DMC), ethyl methyl carbonate (EMC), and the like can be suitably used. Alternatively, fluorine solvents such as fluorinated carbonates, for example, mono-fluoroethylene carbonate (MFEC), difluoroethylene carbon-ate (DFEC), monofluoromethyldifluoromethyl carbonate (F-DMC), and trifluorodimethyl carbonate (TFDMC) can be preferably used. These non-aqueous solvents can be used alone or two or more thereof can be used in appropriate combination. Regarding the supporting salt, lithium salts, for example, $LiPF_6$, $LiBF_4$, and $LiClO_4$, can be suitably used. The concentration of the supporting salt is not par-ticularly limited, and is preferably about 0.7 mol/L or more and 1.3 mol/L or less.

Here, the non-aqueous electrolyte may contain compo-nents other than the above non-aqueous solvent and sup-porting salt as long as the effects of the technology disclosed herein are not significantly impaired, and may contain various additives, for example, a gas generating agent, a film forming agent, a dispersant, and a thickener.

Figure 3:
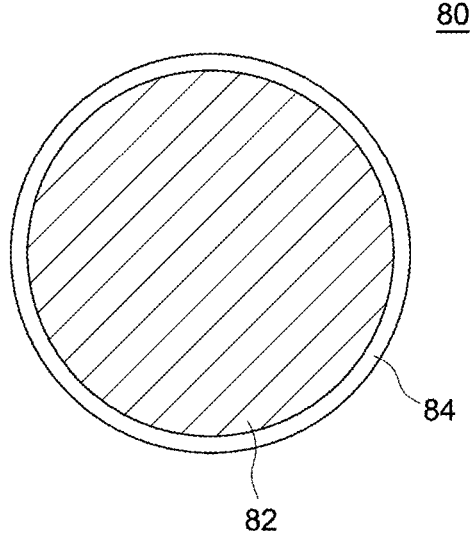
FIG. 3 is a schematic view showing a cross-sectional structure of one particle constituting a negative electrode active material according to one embodiment.

FIG. 3 schematically shows a cross section of a particle (a negative electrode active material particle 80) constituting the negative electrode active material disclosed herein. The negative electrode active material particle 80 includes a carbon material 82 and a carbon coating layer 84 that covers the surface of the carbon material 82.

The carbon material 82 may be a material (typically, particulate) composed of carbon atoms that is able to revers-ibly occlude and release lithium ions. Regarding the carbon material 82, for example, a particulate carbon material (carbon particle) having a graphite structure (layered struc-ture) in at least a part may be exemplified. In addition, a so-called graphite material (graphite), a non-graphitizable carbon material (hard carbon), an easily graphitizable car-bon material (soft carbon), and a material having a structure combining these can be used as carbon materials. Among these, graphite particles such as natural graphite can be preferably used.

The carbon coating layer 84 may be formed on at least a part of the surface of the carbon material 82, and the carbon coating layer 84 is formed on preferably 70% or more, more preferably 80% or more, and still more preferably 90% or more (or 100%) of the surface area of the carbon material 82. When the carbon coating layer 84 is formed at a high ratio, since the area of the carbon coating layer 84 in contact with a non-aqueous electrolytic solution increases, the effect of improving low temperature characteristics obtained by the carbon coating layer 84 can be exhibited at a higher level.

The average particle size of the negative electrode active material particle 80 is not particularly limited, and in con-sideration of handing properties, ease of forming the carbon coating layer 84, and the like, it may be generally 0.5 μm or more and 50 μm or less, and typically 1 μm or more and 20 μm or less, for example, 5 μm or more and 10 μm or less. Here, the "average particle size" in this specification is a particle size of cumulative 50% in a volume-based particle size distribution obtained by measuring a particle size dis-tribution based on a laser diffraction/light scattering method.

The average thickness of the carbon coating layer 84 is not particularly limited, and is generally 2 nm or more and 2 μm or less, and typically 5 nm or more and 1 μm or less.

The carbon coating layer 84 includes carbon atoms and phosphorus atoms, and may further contain one or two or more other elements such as oxygen atoms. The element ratio of the carbon coating layer 84 and abundance proportions of bonding forms between atoms can be measured through X-ray photoelectron spectroscopy (XPS). XPS is a method in which X-rays are emitted to a surface of a sample, the emitted photoelectron energy is measured, and elements constituting the surface of the sample and their electron states are analyzed. Since the spectrum obtained by XPS exhibits a substance-specific pattern and a peak area pro-portional to the amount of a substance, it is possible to qualitatively and quantitatively analyze the substances. Therefore, it is possible to determine elements constituting the carbon coating layer 84 present on the surface of the negative electrode active material particle 80 and bonding forms between atoms.

In the negative electrode active material disclosed herein, since the carbon coating layer 84 may contain carbon atoms, phosphorus atoms, and oxygen atoms, the peak of the Cis spectrum measured through the XPS (typically, a peak with a peak top in a binding energy range of 279 eV to 298 eV), a peak area of the O1s spectrum (typically, a peak with a peak top in a binding energy range of 528 eV to 540 eV), and a peak area of the P2p spectrum (typically, a peak with a peak top in a binding energy range of 128 eV to 140 eV) can be measured. Here, the peak of the C1s spectrum is a peak derived from the energy of the is orbital of the carbon atom, the peak of the 01 spectrum is a peak derived from the energy of the Is orbital of the oxygen atom, and the peak of the P2p spectrum is a peak derived from the energy of the $2p$ orbital of the phosphorus atom.

When the total sum (hereinafter referred to as a "sum T of peak areas") of the peak area of the C1s spectrum, the peak area of the O1s spectrum, and the peak area of the P2p spectrum is set as 100%, the peak area of the C1s spectrum can be typically 80% or more (for example, 85% or more), the peak area of the O1s spectrum can be 20% or less (typically, 15% or less), and the peak area of the P2p spectrum can be 5% or less (typically 3% or less). The peak area of the P2p spectrum is preferably 2% or less (for example, 1.9% or less). In addition, the proportion of the peak area of the P2p spectrum is typically 0.1% or more, preferably 0.8% or more, and more preferably 1.4% or more. With such proportions, particularly excellent low tempera-ture characteristics can be realized.

Since the peak of the P2p spectrum can be composed of a plurality of adjacent peaks overlapping, waveform sepa-ration is performed by curve fitting (typically, fitting based on a nonlinear least squares method), and for example, waveforms can be separated into a peak at a position with a binding energy of 131 eV, a peak at a position with a binding energy of 133 eV, and a peak at a position with a binding energy of 135 eV. Here, waveform separation can be per-formed using, for example, software "MultiPak" (commer-cially available from ULVAC-PHI Inc). Typically, the peak at the position of 131 eV is a peak derived from the C—P—C bond, the peak at the position of 133 eV is a peak derived from the P—O bond, and the peak at the position of 135 eV is a peak derived from the O—P—O bond. Here, the "peak at the position of 131 eV" in this specification includes a deviation of the position of the peak top that may occur due to measurement conditions and the like, and may include a peak at a position in the vicinity of 131 eV. That is, typically, it may be a peak at a position of 131 eV±0.9 eV, for example, a peak at a position of 131 eV±0.5 eV or 131 eV±0.1 eV. The same applies to the "peak at the position of 133 eV" and the "peak at the position of 135 eV," which can be a peak at a position of 133 eV±0.9 eV (for example, 133 eV±0.5 eV and 133 eV±0.1 eV) and a peak at a position of 135 eV±0.9 eV (for example, 135 eV±0.5 eV and 135 eV±0.1 eV), respectively.

The carbon coating layer 84 preferably has a peak at the position of 131 eV. That is, the carbon coating layer 84 preferably has a C—P—C bond. Therefore, a desolvation reaction of lithium ions can be promoted due to surplus electrons derived from phosphorus atoms so that low temperature characteristics can be improved. Here, "having a peak" means that there is a peak having a peak area of 0.1% or more when the sum T of the peak areas is set as 100%.

In addition, the proportion of the peak area at the position of 131 eV when the sum T of the peak areas is set as 100% is not particularly limited, and is, for example, 0.1% or more and 5% or less, preferably 0.4% or more and 0.7% or less, and more preferably 0.6% or more and 0.7% or less. Within such a range, since a desolvation reaction of lithium ions can be promoted due to surplus electrons derived from phosphorus atoms, low temperature characteristics can be improved.

The proportion of the peak area at the position of 133 eV when the sum T of the peak areas is set as 100% is not particularly limited, and it can be, for example, 0.1% or more and 2% or less (for example, 0.1% or more and 0.5% or less), and is preferably 0.3% or more and 0.5% or less.

The proportion of the peak area at the position of 135 eV when the sum T of the peak areas is set as 100% is not particularly limited, and it can be, for example, 0.1% or more and 2% or less (for example, 0.2% or more and 0.5% or less), and is preferably 0.3% or more and 0.5% or less.

The carbon coating layer 84 has an amorphous structure, and may contain very small crystallites composed of carbon atoms in $sp^2$ hybridized orbitals, carbon atoms having a bond formation other than through $sp^2$ hybridized orbitals, and the like. The crystallinity of the carbon coating layer 84 is evaluated by Raman spectrum analysis. In order to measure the Raman spectrum, a conventionally known method can be appropriately used. In the carbon coating layer 84, in Raman spectrum analysis using an appropriate laser light (for example, an argon ion laser) as a light source, when the peak intensity at 1,580 cm$^{-1}$ is represented as $I_G$ and the peak intensity at 1,360 cm$^{-1}$ is represented as $I_D$, the value of the intensity ratio ($I_D/I_G$) of $I_D$ to $I_G$ is preferably 0.4 or more and 0.7 or less and more preferably 0.6 or more and 0.7 or less. Within such a range, the capacity of accepting lithium ions at low temperatures can be improved, and low temperature characteristics can be improved. Here, in this specification, the "peak intensity at 1,580 cm$^{-1}$" is a peak intensity in the vicinity of 1,580 cm$^{-1}$ (for example, a range (G band) of 1,570 cm$^{-1}$ to 1,620 cm$^{-1}$). In addition, in this specification, the "peak intensity at 1,360 cm$^{-1}$" is a peak intensity in the vicinity of 1,360 cm$^{-1}$ (for example, in a range (D band) of 1,300 cm$^{-1}$ to 1,400 cm$^{-1}$).

Next, a preferable method of producing the negative electrode active material disclosed herein will be described. Here, the method of producing the negative electrode active material disclosed herein is not limited to the following.

The preferable method of producing the negative electrode active material disclosed herein includes a process of preparing a carbon material that is able to reversibly occlude and release lithium ions (hereinafter referred to as a "preparation process"), a process of forming a carbon coating layer containing carbon atoms and phosphorus atoms on the surface of the carbon material by a CVD method (hereinafter referred to as a "coating process"), and a process of firing the carbon material having the carbon coating layer (hereinafter referred to as a "firing process").

First, the preparation process will be described. As the carbon material that is able to reversibly occlude and release lithium ions, a material that can be used for the above carbon material 82 may be used. Such a material may be purchased as a commercial product or may be produced by a conventionally known method.

Next, the coating process will be described. A chemical vapor deposition (CVD) method can be suitably used to form a carbon coating layer on the surface of the prepared carbon material. According to the CVD method, a C—P—C bond can be suitably formed on the carbon coating layer. Here, the CVD method is generally roughly classified into a thermal CVD method, a plasma CVD method, an optical CVD method and the like, but any method can be used, and here, the thermal CVD method will be described as an example. Here, in this specification, "1 sccm" is a unit indicating a flow rate at which 1 cc (1 mL) is supplied per minute under an atmospheric pressure at 0° C.

Regarding the thermal CVD method itself, the same process as in the related art may be used, and no special device is required. For example, first, a carbon material is placed in a reaction container (for example, tubular furnace) as a coating object. Next, the inside of the reaction container is purged with an inert gas (for example, a gas that does not contribute to the reaction of carbon coating layer formation such as Ar gas). After purging with the inert gas, the temperature in the reaction container is raised (for example, 800° C. or higher and 1,000° C. or lower). Then, a precursor gas of a carbon coating is supplied into the reaction container together with the inert gas. A supply rate (flow rate) of the inert gas is not particularly limited, and can be, for example, 50 sccm or more and 350 sccm or less. In addition, the supply rate (flow rate) of the precursor gas is not particularly limited, and can be, for example, 100 sccm or more and 300 sccm or less. In addition, a supply amount (flow rate) of the precursor gas and the inert gas can be provided, for example, at a ratio of 1:3 to 3:2. The reaction time after such supply is not particularly limited because it can be changed depending on a desired thickness of the carbon coating layer, and can be, for example, a time of about 45 minutes to 90 minutes. In addition, during such a reaction, it is preferable to rotate the reaction container, and for example, the reaction container can be rotated at a rotational speed of 10 rpm or more and 50 rpm or less. According to such rotation, a more uniform carbon coating layer can be formed over the entire surface of the carbon material. Here, these operations can be performed in the reaction container under atmospheric pressure or in a reduced pressure state (for example, 1×10$^4$ Pa or more and 8×10$^4$ Pa or less).

As a precursor that serves as a carbon atom supply source, a hydrocarbon gas used in the conventional CVD method can be used, and examples thereof include methane, ethylene, and acetylene. These may be used in combination of one or two or more thereof. Among these, acetylene can be preferably used.

A precursor that serves as a phosphorus atom supply source is not particularly limited, and for example, phosphorus oxychloride (chemical formula: POCl$_3$) can be preferably used. Since phosphorus oxychloride is a liquid at mom temperature under atmospheric pressure, it can be used as a precursor gas for forming a carbon coating by gasifying it by heating and then mixing it with a hydrocarbon gas.

The mixing ratio of hydrocarbon gas and phosphorus oxychloride gas is not particularly limited because it can be adjusted according to the amount of phosphorus atoms to be introduced into the carbon coating layer, and for example, a mixture of hydrocarbon gas and phosphorus oxychloride in a molar ratio range of 20:1 to 3:1 can be used.

Next, the firing process will be described. In the firing process, the carbon material having the carbon coating layer produced in the coating process is fired under an inert gas atmosphere (for example, Ar gas), and thus the crystallinity of the graphite structure having conductivity can be improved. That is, in the Raman spectrum of the carbon coating layer, the intensity ratio $I_D/I_G$ between the peak intensity $I_G$ at 1,580 cm$^{-1}$ and the peak intensity $I_D$ at 1,360 cm$^{-1}$ can be reduced, and can be adjusted to a desired intensity ratio $I_D/I_G$ (for example, 0.4 or more and 0.7 or less). The firing temperature and the firing time are not particularly limited, and for example, it is preferable to perform firing at a firing temperature of 900° C. to 1,100° C. (for example, 1,000° C.) for 1 hour to 9 hours (for example, 2 hours to 8 hours). Here, if the firing temperature is too high or the firing time is too long, there is a risk of phosphorus atoms and oxygen atoms contained in the carbon coating layer undergoing a dereaction.

One example of the preferable method of producing the negative electrode active material disclosed herein has been described above. The lithium ion secondary battery 100 including such a negative electrode active material can be used for various applications. For example, it can be suitably used as a high output power source for a motor (driving power supply) mounted in a vehicle. The type of vehicle is not particularly limited, and typically automobiles, for example, plug-in hybrid electric vehicles (PHEV), hybrid electric vehicles (HEV), and battery electric vehicles (BEV) may be exemplified. The lithium ion secondary battery 100 can be used in the form of an assembled battery in which a plurality of batteries are electrically connected.

Examples related to the technology disclosed herein will be described below, and are not intended to limit the technology disclosed herein to such examples.

Production of Negative Electrode Active Material

A carbon coating layer was formed on the surface of graphite (SG-BH8, commercially available from Ito Graphite Co., Ltd.) using a rotary CVD method. Here, a rotary tubular atmospheric furnace (commercially available from HeatTec Co., Ltd.) was used as the rotary CVD device. Table 1 shows conditions for the CVD method in Examples 1 to 6.

Example 1

20 g of graphite (SG-BH8) was accommodated in a tubular furnace, and the inside of the tubular furnace was purged with Ar gas. After the temperature inside the tubular furnace was set to 800° C., while rotating the tubular furnace at a rate of 10 rpm, a mixed gas in which $C_2H_2$ gas and POCl$_3$ gas as precursor gases were mixed at a molar ratio of 10:1 was supplied at a flow rate of 200 sccm for 60 minutes, and a carbon coating layer was formed. Here, during this operation, Ar gas was constantly supplied at a flow rate of 300 sccm.

Example 2

20 g of graphite (SG-BH8) was accommodated in a tubular furnace, and the inside of the tubular furnace was purged with Ar gas. After the temperature in the tubular furnace was set to 950° C., while rotating the tubular furnace at a rate of 10 rpm, $CH_4$ gas as a precursor gas was supplied at a flow rate of 150 sccm for 80 minutes, and a carbon coating layer was formed. Here, during this operation, Ar gas was constantly supplied at a flow rate of 50 sccm. Then, additional firing was performed at 1,000° C. for 2 hours in an Ar gas atmosphere.

Example 3

A negative electrode active material was produced in the same manner as in Example 1, and additional firing was then performed on the negative electrode active material at 1,000° C. for 2 hours in an Ar atmosphere.

Example 4

Example 4 was performed in the same manner as in Example 3 except that additional firing in Example 3 was performed for 4 hours.

Example 5

Example 5 was performed in the same manner as in Example 3 except that additional firing in Example 3 was performed for 8 hours.

Example 6

Example 6 was performed in the same manner as in Example 3 except that additional firing in Example 3 was performed for 10 hours.

Example 7

50 g of the negative electrode active material produced by the method of Example 2 was prepared, and the surface of the negative electrode active material was processed by barrel sputtering using $Li_3PO_4$. Here, the sputtering rate was set to 0.01 g/h, and sputtering was performed for 3 hours.

TABLE 1

| | Temperature (° C.) | Time (minutes) | Precursor gas | Flow rate of precursor gas (sccm) | Flow rate of Ar gas (sccm) | Additional firing time (hour) |
|---|---|---|---|---|---|---|
| Example 1 | 800 | 60 | $C_2H_2$/POCl$_3$ | 200 | 300 | — |
| Example 2 | 950 | 80 | $CH_4$ | 150 | 50 | 2 |
| Example 3 | 800 | 60 | $C_2H_2$/POCl$_3$ | 200 | 300 | 2 |
| Example 4 | 800 | 60 | $C_2H_2$/POCl$_3$ | 200 | 300 | 4 |
| Example 5 | 800 | 60 | $C_2H_2$/POCl$_3$ | 200 | 300 | 8 |
| Example 6 | 800 | 60 | $C_2H_2$/POCl$_3$ | 200 | 300 | 10 |

Composition Analysis of Surface of Negative Electrode Active Material

The surfaces (carbon coating layer) of the produced negative electrode active materials were measured through X-ray photoelectron spectroscopy (XPS). Specific measurement conditions were as follows.

Measurement device: scanning X-ray photoelectron spectrometer (u-XPS) QuanteraII (commercially available from ULVAC-PHI Inc)

X-ray source used: mono-AlKa line (1,486.6 V)

Photoelectron take-off angle: 35°

X-ray beam diameter: about 100 μm

Neutralization gun conditions: 1.0 V, 20 μA

A peak area Ac of the C1s spectrum, a peak area Ao of the O1s spectrum and a peak area Ap of the P2p spectrum obtained by the XPS were calculated. Table 2 shows a proportion of Ac (the column C1s in Table 2), a proportion of Ao (the column O1s in Table 2), and a proportion of Ap (the column P2p in Table 2) when a sum of these Ac, Ao, and Ap was set as 100%.

In addition, the peak of the P2p spectrum was subjected to waveform separation using software "MultiPak" (commercially available from ULVAC-PHI Inc), and separated into peaks at positions of 131 eV, 133 eV, and 135 eV. Then, Table 2 shows proportions of respective peak areas with respect to a total of the Ac+Ao+Ap.

The produced negative electrode active materials were analyzed by a Raman spectropic analyzer (commercially available from Renishaw, microscopic Raman spectroscopic measurement device, inVia Reflex 785S, an excitation wavelength of 532 nm, Ar laser) to obtain a Raman spectrum. The peak intensity at 1,580 cm$^{-1}$ of the Raman spectrum was measured as $I_G$, the peak intensity at 1,360 cm$^{-1}$ was measured as $I_D$, and the intensity ratio ($I_D/I_G$) of $I_D$ to $I_G$ was obtained. The values thereof are shown in Table 2.

Construction of Lithium Ion Secondary Battery for Evaluation

A lithium nickel cobalt manganese composite oxide ($LiNi_{1/3}Co_{1/3}Mn_{1/3}O_2$, hereinafter referred to as "NCM") as a positive electrode active material, acetylene black (AB) as a conductive material, and polyvinylidene fluoride (PVdF) as a binder were mixed in N-methyl-2pyrrolidone so that the mass ratio of NCM:AB:PVdF was 92:5:3, and thereby a paste for forming a positive electrode active material layer was prepared. This paste was applied to an aluminum foil current collector with a thickness of 15 μm, dried and then pressed to produce a sheet-shaped positive electrode.

The produced negative electrode active material (C), styrene butadiene rubber (SBR) as a binder, and carboxym- 10 μm, dried and then pressed to produce a sheet-shaped negative electrode.

In addition, two porous polyolefin sheets having a three-layer structure of PP/PE/PP as a separator and having a thickness of 24 μm were prepared. An HRL including alumina and boehmite and having a thickness of 4 μm was formed on the surface of the separator facing the positive electrode.

A wound electrode body was produced by laminating and winding the produced sheet-shaped positive electrode and negative electrode so that they faced each other with a separator therebetween. A current collector plate bonded to an electrode terminal was bonded to the wound electrode body, which was accommodated in a battery case. Then, a non-aqueous electrolytic solution was injected from a liquid injection port of the battery case and sealed. As the non-aqueous electrolytic solution, a solution in which $LiPF_6$ as a supporting salt was dissolved at a concentration of 1.0 mol/L in a mixed solvent containing ethylene carbonate (EC), dimethyl carbonate (DMC), and ethyl methyl carbonate (EMC) at a volume ratio of 3:3:4 was used. As described above, a lithium ion secondary battery for evaluation was obtained.

Activation Treatment

The produced lithium ion secondary battery for evaluation was placed in a 25° C. environment. A constant current-constant voltage method was used, each lithium ion secondary battery for evaluation was charged to 4.1 V with a constant current at a current value of ⅓C, constant voltage charging was then performed until the current value became ⅕0C, and the battery was fully charged. Then, each lithium ion secondary battery for evaluation was discharged to 3.0 V with a constant current at a current value of ⅓C. Here, "1C" indicates a magnitude of a current at which a battery can be charged from a state of charge (SOC) of 0% to 100% in one hour.

Evaluation of −10° C. Acceptability

Each lithium ion secondary battery for evaluation that was subjected to the above activation treatment was placed in a −10° C. environment. Each lithium ion secondary battery for evaluation was set to a SOC of 0%, charged with a constant current at a current value of 5C, and the time required for the SOC to reach 100% was measured. Table 2 shows the relative value of the time in each example when the time in Example 1 was set as 1.00 as "10° C. acceptability." Here, if the time is longer, the capacity of accepting Li in a −10° C. environment is larger. Therefore, a larger numerical value of −10° C. acceptability indicates better battery performance.

TABLE 2

| | C1s (%) | O1s (%) | P2p (%) | 131 eV (%) | 133 eV (%) | 135 eV (%) | $I_D/I_G$ | −10° C. acceptability |
|---|---|---|---|---|---|---|---|---|
| Example 1 | 93.3 | 5.4 | 1.3 | 0.4 | 0.2 | 0.7 | 0.9 | 1.00 |
| Example 2 | 98.8 | 1.2 | 0 | 0 | 0 | 0 | 0.5 | 0.95 |
| Example 3 | 87 | 11 | 1.9 | 0.7 | 0.5 | 0.5 | 0.7 | 1.12 |
| Example 4 | 86 | 13 | 1.4 | 0.6 | 0.3 | 0.3 | 0.6 | 1.10 |
| Example 5 | 91 | 8.4 | 0.8 | 0.4 | 0.1 | 0.2 | 0.4 | 1.05 |
| Example 6 | 94.2 | 5.7 | 0.1 | 0.1 | 0 | 0 | 0.3 | 0.98 |
| Example 7 | 90.6 | 7.2 | 2.2 | 0 | 2.1 | 0.1 | 0.6 | 1.02 | ethyl cellulose (CMC) as a thickener were mixed in deionized water so that the mass ratio of C:SBR:CMC was 99:0.5:0.5, and thereby a paste for forming a negative electrode active material layer was prepared. This paste was applied to a copper foil current collector with a thickness of As shown in Table 2, it was confirmed that Examples 3 to 5 in which, when the P2p spectrum measured through XPS was subjected to waveform separation, there was a peak at the position of 131 eV and the value of $I_D/I_G$ was 0.4 or more and 0.7 or less had better −10° C. acceptability than Example 1 and Example 6 in which there was a peak at the position of 131 eV, but the value of $I_D/I_G$ was outside the range of 0.4 or more and 0.7 or less. In addition, in Example 7, even if the value of $I_D/I_G$ was 0.6, since it did not have a peak at the position of 131 eV, the $-10°$ C. acceptability was not better than in Examples 3 to 5.

In addition, it could be understood that, since Example 3 and Example 4 exhibited particularly excellent $-10°$ C. acceptability, the value of $I_D/I_G$ is more preferably 0.6 or more and 0.7 or less.

While specific examples of the technology disclosed herein have been described above in detail, these are only examples, and do not limit the scope of the claims. The technologies described in the scope of the claims include various modifications and alternations of the specific examples exemplified above.

What is claimed is:

1. A negative electrode active material for a lithium ion secondary battery, comprising:

a carbon material that is able to reversibly occlude and release lithium ions; and a carbon coating layer that is formed on an outer surface of the carbon material, wherein the carbon coating layer includes carbon atoms and phosphorus atoms and has a structure in which the phosphorous atoms and the carbon atoms are bonded to each other on the outer surface of the carbon coating layer, and in the carbon coating layer, when a sum of a peak area of a C1s spectrum, a peak area of an O1s spectrum and a peak area of the P2p spectrum measured by X-ray photoelectron spectroscopy (XPS) is 100%, the peak area of the P2p spectrum is 0.8% or more and 2% or less, and when the peak of a P2p spectrum is subjected to waveform separation, there is a peak at a position at which a binding energy is 131 eV, and when a sum of a peak area of a C1s spectrum, a peak area of an O1s spectrum and a peak area of the P2p spectrum measured by XPS is 100%, a proportion of the peak area at the position of 131 eV is 0.4% or more and 0.7% or less, and an intensity ratio ($I_D/I_G$) of a peak intensity $I_D$ at 1,360 cm$^{-1}$ to a peak intensity $I_G$ at 1,580 cm$^{-1}$ in a Raman spectrum is 0.4 or more and 0.7 or less.

2. A lithium ion secondary battery, comprising a positive electrode, a negative electrode, and a non-aqueous electrolyte, wherein the negative electrode has a negative electrode active material layer, and the negative electrode active material layer includes the negative electrode active material according to claim 1.

3. The negative electrode active material according to claim 1, wherein, when a sum of a peak area of a C1s spectrum, a peak area of an O1s spectrum and a peak area of the P2p spectrum measured by XPS is 100%, the peak area of the P2p spectrum is 1.4% or more and 2% or less.

* * * * *